J. C. BATES.
PLANT AND TREE DIGGER.
APPLICATION FILED JUNE 9, 1915.
1,162,126.
Patented Nov. 30, 1915.
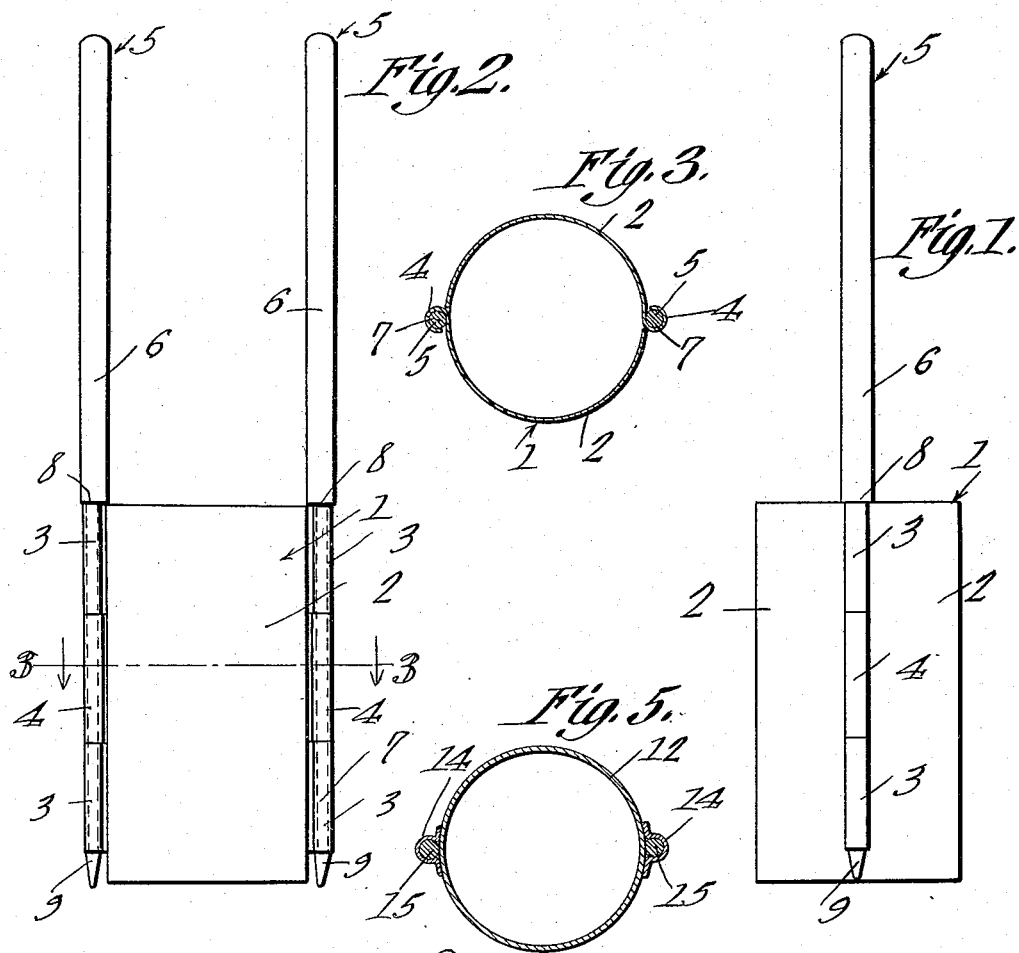
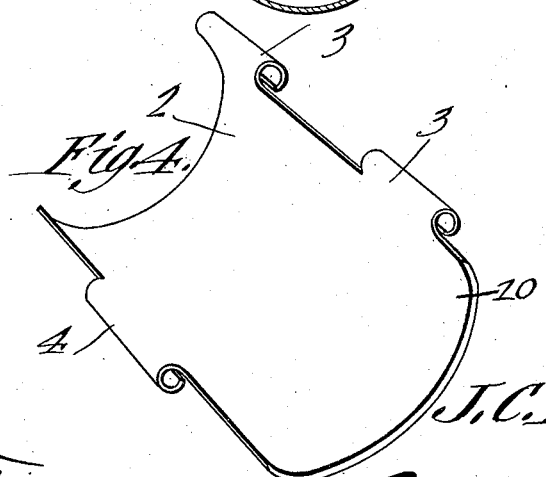
Witnesses
J. R. Tomlin
R. L. Parker.
J. C. Bates
Inventor
by C. A. Snow & Co.
Attorneys

UNITED STATES PATENT OFFICE.

JOHN C. BATES, OF LAKE CITY, FLORIDA.

PLANT AND TREE DIGGER.

1,162,126.  Specification of Letters Patent.  Patented Nov. 30, 1915.

Application filed June 9, 1915. Serial No. 33,131.

*To all whom it may concern:*

Be it known that I, JOHN C. BATES, a citizen of the United States, residing at Lake City, in the county of Columbia and State of Florida, have invented a new and useful Plant and Tree Digger, of which the following is a specification.

The device forming the subject matter of this application is adapted to be employed for removing from the earth, plants, small trees and the like.

One object of the invention is to provide a novel means whereby the device may be manipulated to insert the shell portion thereof into the earth about the plant or tree which is to be removed.

Another object of the invention is to provide a device of the type above mentioned, comprising a shell which may be opened readily, to permit the ball of earth about the roots of the plant or tree to be wrapped.

Another object of the invention is to provide a device of the sort above alluded to in which the handles exercise additional functions, in that they constitute reinforcements for the sides of the shell and serve also as pivot elements or pintles, whereby the shell may be opened.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in side elevation; Fig. 2 is a side elevation wherein the device is viewed at right angles to the showing of Fig. 1; Fig. 3 is a cross section on the line 3—3 of Fig. 2; Fig. 4 is a perspective showing one of the members which go to make up the shell; Fig. 5 is a cross section showing a modified form of the invention.

In carrying out the present invention there is provided a resilient, tubular, metallic shell 1 including opposed, trough-like parts 2, each part 2 being provided along one of its edges with sockets 3 and being provided along its opposite edge with a socket 4, the socket 4 on one of the parts 2 of the shell being adapted to register between the sockets 3 of the other, corresponding part of the shell.

Into the alined sockets 3 and 4 of the parts 2 of the shell 1 are inserted handles 5, each handle 5 comprising a body 6 and a reduced stem 7, defining a shoulder 8. The lower end of the stem 7 of each handle 5 is reduced in diameter to form a guiding and directing point 9. The shoulders 8 coöperate with certain of the sockets 3 to prevent downward movement of the handles 5 independently of the shell 1, the construction, obviously, being such that the shell 1 may be thrust readily into the ground by means of the handles 5. Either of the handles 5 may be removed from the sockets 3 and 4, and thus the handle which remains in place acts as a hinge pintle, permitting the parts 2 of the shell 1 to be opened with respect to each other. This operation is desirable, at times, in order that the shell 1 may be placed around the plant or tree which is to be removed. Again, after the plant or tree has been removed, the earth being compacted around the roots of the tree in the form of a ball, the digger may be laid upon its side, and one of the handles 5 may be removed, one of the shell parts 2 being swung to an open position. A piece of burlap then may be placed around the earth, the shell may be closed, inverted and opened on its opposite side, whereupon the burlap may be sewed or secured otherwise around the ball of earth in which the roots of the tree or plant are held.

The handles 5 exercise three functions. First, as will be obvious, they constitute a means whereby the shell 1 may be thrust into the ground; secondly, they act as reinforcements for the shell; and third, each handle forms a hinge pintle for the parts 2 of the shell 1 when the other handle is removed from the sockets 3 and 4.

If desired, in order to facilitate the insertion of the lower end of the shell 1 into the ground, the same may be beveled as shown at 10, a skilled mechanic being capable of beveling the shell either inwardly or outwardly, as may be desired.

At times, it is not necessary to open the shell, and under such circumstances, the structure shown in Fig. 5 of the drawings is resorted to. In this form of the invention, the shell 12 is of continuous tubular form and is equipped along its edges with sockets 14 adapted to receive handles 15, constructed like the handles 5.

Especial attention is directed to the "balling" function of the present device. It is to be observed that it is possible to take up a plant or tree at any time of the year, with the earth in which it is growing, the plant or tree being undisturbed, saving for the fact that some of the smaller lateral roots have been trimmed off as the digger has been inserted into the ground. The operation of transferring a plant or tree from one location to another may thus be brought about without shock or injury and with a minimum amount of disturbance to the earth in which the roots are inclosed.

Having thus described the invention, what is claimed is:—

1. A plant and tree digger comprising a tubular shell having opposed, longitudinal side sockets; and handles inserted into the sockets, the handles upstanding above the shell.

2. A plant and tree digger comprising a tubular shell having opposed, longitudinal side sockets; and handles inserted into the sockets, the handles upstanding above the shell and being provided with shoulders coöperating with the sockets to limit the downward movement of the handles independently of the shell.

3. A plant and tree digger comprising a tubular shell having opposed, longitudinal side sockets; and handles inserted into the sockets, the handles upstanding above the shell, the handles being reduced adjacent their lower ends to define guiding and entering points.

4. A plant and tree digger comprising trough like parts coacting to define a tubular shell, the parts of the shell having sockets upon their adjacent edges; and upstanding handles inserted into the sockets of the respective shell parts, the handles constituting reinforcements for the sides of the shell, and each handle constituting a hinge pintle uniting the shell parts pivotally when the other handle is removed.

5. A plant and tree digger comprising trough-like parts coacting to define a tubular shell, the parts of the shell having sockets upon their adjacent edges; and upstanding handles inserted into the sockets of the respective shell parts, the handles constituting reinforcements for the sides of the shell, and each handle constituting a hinge pintle uniting the shell parts pivotally when the other handle is removed, the handles having shoulders coöperating with certain of the sockets to limit the downward movement of the handles independently of the shell.

6. A plant and tree digger comprising trough-like parts coacting to define a tubular shell, the parts of the shell having sockets upon their adjacent edges; and upstanding handles inserted into the sockets of the respective shell parts, the handles constituting reinforcements for the sides of the shell, and each handle constituting a hinge pintle uniting the shell parts pivotally when the other handle is removed, the handles being reduced adjacent their lower ends to define guiding and entering points.

In testimony that I claim the foregoing as my own, I have hereto affixed by signature in the presence of two witnesses.

JOHN C. BATES.

Witnesses:
  E. S. FUTCH,
  FRED H. YOUNG.

Copies of this patent may be obtained for five cents each, by addressing the "Commissioner of Patents, Washington, D. C."